Aug. 20, 1935.  A. F. HICKMAN  2,012,008
RESILIENTLY MOUNTED WHEEL
Filed May 25, 1932  3 Sheets-Sheet 1
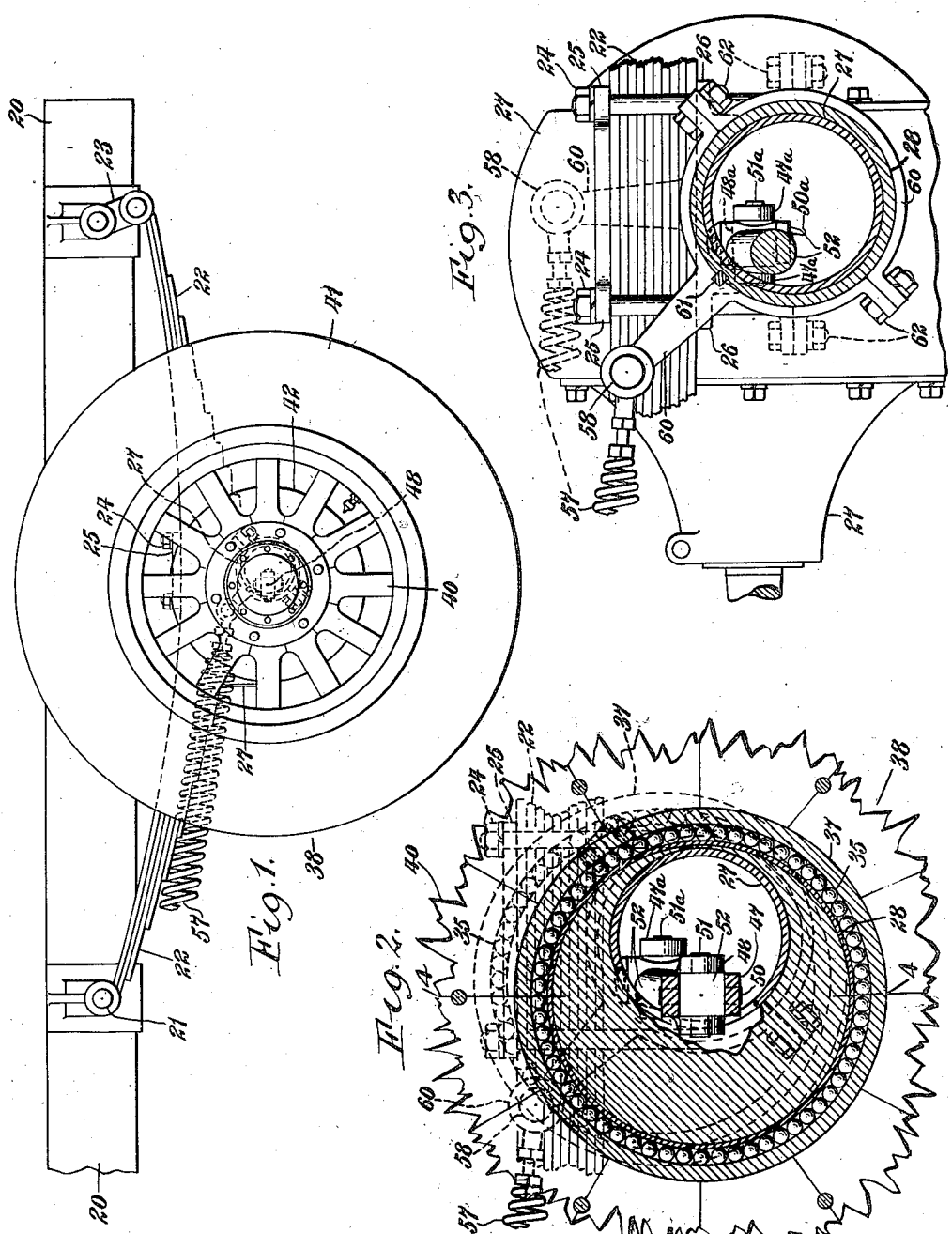
Inventor
Albert F. Hickman
by Popp & Powers
Attorneys

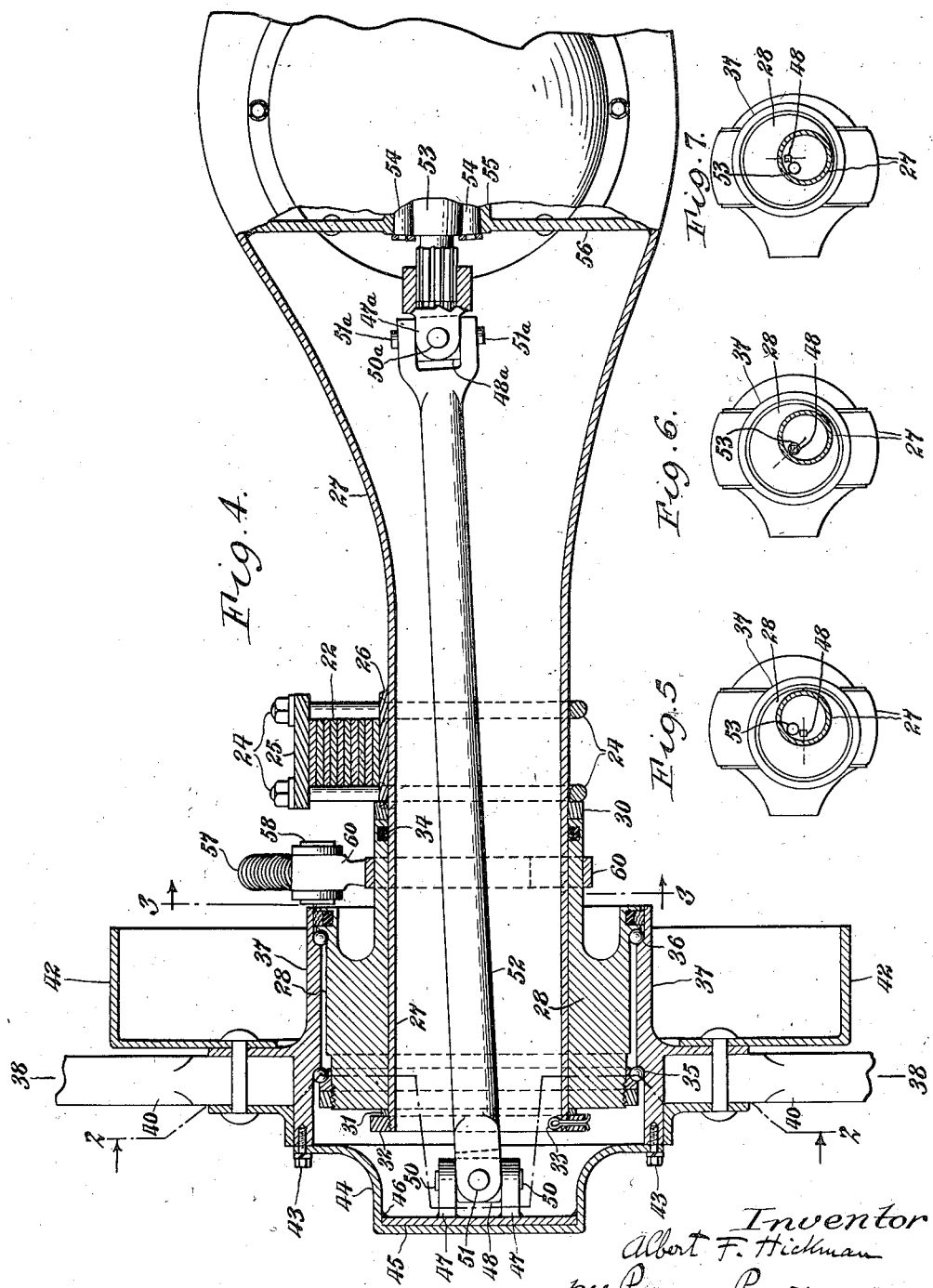

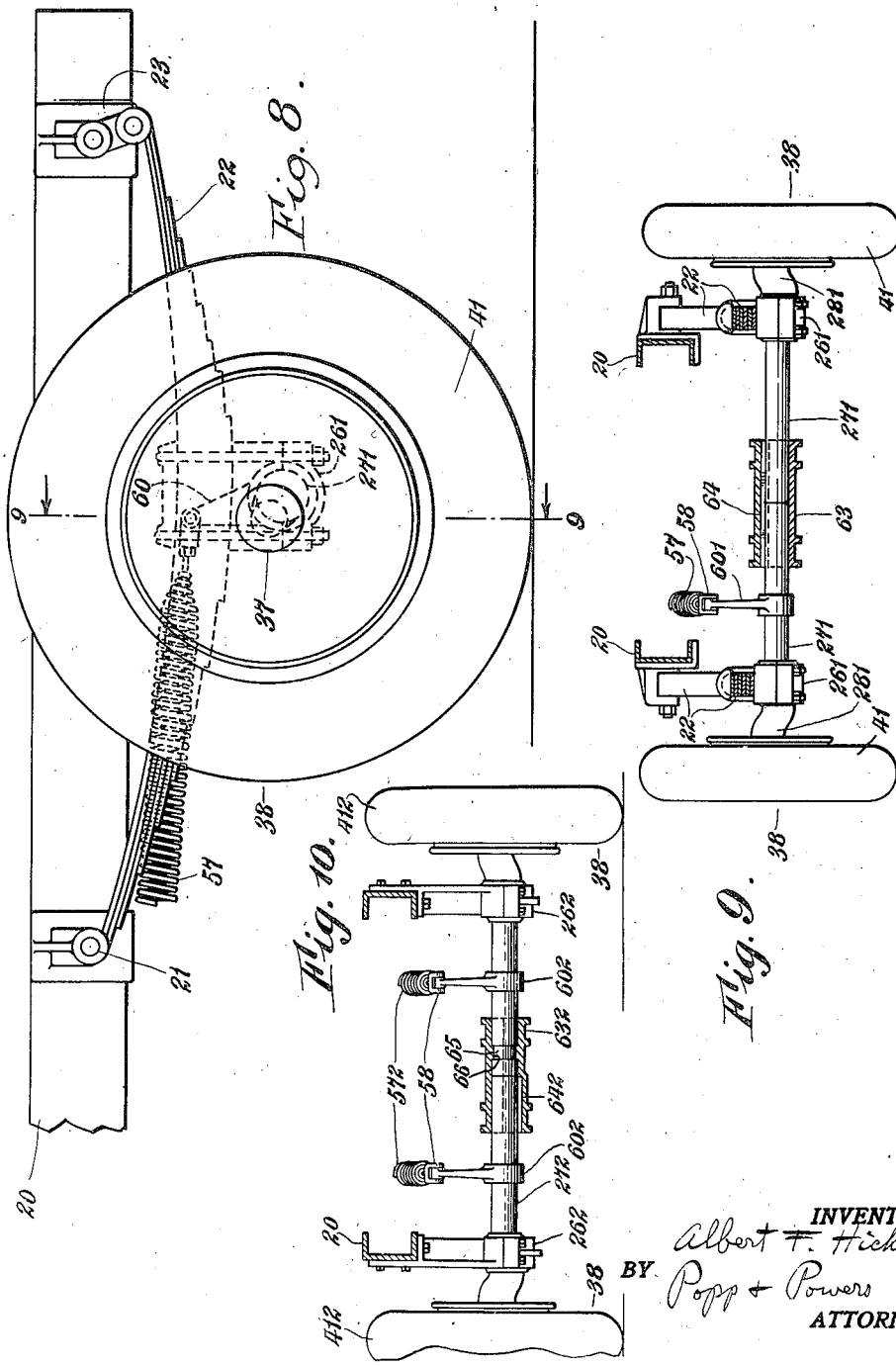

Patented Aug. 20, 1935

2,012,008

UNITED STATES PATENT OFFICE 2,012,008

RESILIENTLY MOUNTED WHEEL

Albert F. Hickman, Eden, N. Y., assignor to Hickman Pneumatic Seat Company, Inc., Eden, N. Y., a corporation of New York Application May 25, 1932, Serial No. 613,395

2 Claims. (Cl. 280—124)

The invention relates to a resilient vehicle suspension and more particularly to vehicle wheel which is resiliently mounted on an axle or its equivalent.

The principal object of the invention is to reduce the unsprung weight of the vehicle suspension and, at the same time, to obtain all the advantages disclosed in my application for Vehicle suspension Serial No. 497,653, filed November 24, 1930 of which the present application is a continuation in part. Numerous other objects of the invention and practical solutions thereof are disclosed in detail in the herein patent specification wherein:

In the accompanying drawings:

Fig. 1 is a side elevation of the rear end of a vehicle chassis showing a rear wheel connected with the vehicle frame in accordance with the present invention.

Fig. 2 is an enlarged, vertical, transverse section through the hub of said wheel, taken on line 2—2, Fig. 4.

Fig. 3 is an enlarged, vertical, transverse section through the axle housing taken on line 3—3, Fig. 4.

Fig. 4 is an enlarged, vertical, longitudinal section through said axle housing and associated parts, taken on line 4—4, Fig. 2.

Figs. 5, 6 and 7 are diagrammatic representations of a form similar to Fig. 3 and showing the axis of the wheel in various positions relatively to the axle housing upon which said wheel is eccentrically and rotatably mounted.

Fig. 8 is a side elevation of the rear end of a trailer or similar vehicle chassis showing a modified form of resiliently mounted wheel.

Fig. 9 is a diminutive, vertical, transverse section thereof taken on line 9—9, Fig. 8.

Fig. 10 is a diminutive, vertical, transverse section through a trailer or similar vehicle chassis and similar to Fig. 9 but showing a still further modified form of resiliently mounted wheel.

Similar characters of reference indicate like parts in the several figures of the drawings.

My invention may be embodied in various forms and in gear shifts of different constructions and the present applications are therefore to be regarded merely as a few of the organizations which satisfactorily carry out the invention in practice. As here shown the same are constructed as follows (considering for the present only Figs. 1–7):—

To the main chassis side bar or frame 20 is pivoted at its front end at 21 a main, semi-elliptic, leaf spring 22, the rear end of which is pivotally connected to said frame 20 by a shackle 23 in the usual and well known manner. The middle or thick portion of this main spring 22 is secured by a pair of clamp or U bolts 24 and straddle plate 25 to a saddle 26. In the construction of Figs. 1–7, this saddle 26 is secured by welding to a tubular or hollow rear-axle housing 27.

It will be noted that this axle housing is not symmetrical, the reasons for this arrangement being explained hereinafter. The outer ends of said axle housing are, however, of straight cylindrical form and on each end of said axle is journaled an eccentric head 28 having a concentric axis of rotation which is coincident with the axis of the outer end of the axle housing. Any longitudinally inward thrusts of said eccentric head 28 are resisted by an inner thrust ring 30 which is backed by the saddle 26. Outward longitudinal thrusts are resisted by an outer thrust ring 31 backed by a ring shaped adjusting nut 32 held in its adjusted position by a cotter pin 33. Escape of lubricant in a longitudinally inward direction from the bearing surface between said eccentric head 28 and axle housing 27 is prevented by a leather packing ring 34 backed by a rubber pressure ring, arranged in the manner shown in my co-pending patent application, Serial No. 603,814, filed April 7, 1932.

Rotatably arranged on ball bearings 35 and 36 on said eccentric head 28 is the hub 37 of a ground wheel 38, the latter being provided with the usual spokes 40, resilient or other tire 41 and brake drum 42. The axis of rotation of this wheel 38 is eccentric with respect to the axis of the outer cylindrical part of the axle housing 27 and hence also with respect to the axis of rotation of the eccentric head 28 relatively to said axle housing. In other words, the wheel 38 is free to rotate upon said eccentric head 28 but is eccentrically moved around the axis of the axle housing 27 whenever said eccentric head so moves.

Secured by cap screws 43 to the hub 37 of said ground wheel 38 is a hub cap 44, the central part of which is reinforced by a reinforcing disk 45 welded at 46 thereto. Projecting longitudinally and coaxially inwardly from said disk 45 is a pair of ears 47 between which is pivoted a universal joint block 48 upon a pin 50. Said block 48, in turn, carries the trunnion pins 51 to which is pivoted the outer bifurcated end of a coupling rod 52. It is to be noted that the trunnion pins 51 are disposed at ninety degrees relatively to the trunnion pins 51a thereby causing an even torque flow from the drive shaft 53 to the wheel 38.

The foregoing arrangement constitutes a universal joint connection between said coupling rod 52 and the hub cap 44, and it is obvious that any other kind of universal joint connection may be used at this point in place of the particular universal joint here illustrated.

The inner end of said coupling rod 52 is also bifurcated and is pivoted to the trunnion pins 51a projecting laterally from an inner universal block 48a which is pivoted on a pin 50a to a pair of ears 47a formed at the outer end of a drive shaft 53. The latter is journaled in the antifriction, tapered, roller bearings 54 in the hub 55 of a partition wall 56. The latter is secured by welding or otherwise to the central part of the axle housing 27. The drive shaft 57 is driven by the usual beveled gear or other differential, but the latter has not been illustrated as it forms no part of the present invention. It is also obvious to those skilled in the art that the wheel 38 may be driven by the drive shaft 53 through any suitable flexible power connection other than the particular one here illustrated.

It is desirable that the wheel 38 be on the average condition as nearly in line with the drive shaft 53 as possible so as to reduce as much as possible the frictional power loss from said drive shaft to said wheel. This average condition of affairs may be presumed to occur when the vehicle is normally loaded, in which case the axis of the wheel 38 (illustrated as the outer, universal joint block 48) and the drive shaft 53 are coincident. Such a position is shown diagrammatically in Fig. 6 and in this case it is obvious that the maximum driving efficiency is obtained because, in such case the axis of the coupling rod 52 is in line with both the axis of the wheel 38 and the drive shaft 53 and hence no power is lost by the turning of said coupling rod and its universal joints about the two pairs of universal joint pivots. The relationship of the parts when the vehicle is unloaded is shown in Figs. 2 and 3 and diagrammatically in Fig. 6. It is obvious, however, that this is not the lower limit of the movement of the wheel 38 relatively to the axle housing 27, such as would occur when the wheel suddenly drops into a hole or is otherwise suddenly relieved of vertical upward pressure after having been subjected to the same. Fig. 7 illustrates diagrammatically the almost extreme upward position assumed by the wheel 38 relatively to the axle housing 27 when said wheel is subjected to an upward thrust of maximum violence. In this position the axis of the wheel (universal block 48) has arrived at a position almost vertically above the axis of the axle housing 27 in which case the thrust against the wheel is almost exactly in line vertically with the axes of said wheel and axle housing or, in other words, with the eccentric and concentric axes of the eccentric head 28. In actual practice the parts are so constructed that such a vertical relationship actually could occur and does almost do so in actual set-ups.

The reason why the axis of the wheel 38 can never be quite moved to a position directly in line with the concentric axis of the eccentric head 28 and with the thrust against the wheel is due to a sinusoidal resilient resistance to rotation of said eccentric head 38 in the manner described more fully in my patent application, Serial No. 497,653, filed November 24, 1930. This resilient resistance to rotation of said eccentric head 28 is effected by a helical or other secondary spring 57, the front end of which is pivotally connected to the vehicle frame 20 while its rear end is pivoted at 58 to the upper end of a torque arm 60 which is secured to the concentric portion of the eccentric head 28, for instance (see Fig. 3) by a key 61 and bolts 62 which clamp its split hub securely in place. By this construction this secondary spring 57 allows very small vertical thrusts against the wheel 38 to cause small increments of up and down movements from the position of Fig. 5. At the same time however this relatively weak secondary spring never allows said wheel 38 to "strike bottom" in either an upward or a downward direction relatively to the axle housing 27, i. e., the eccentric axis of the eccentric head 28 is never quite allowed to assume a position which is in a straight line with the concentric axis of said eccentric head and with the thrust imposed against said wheel. However, the axis of said wheel 38 in actual practice so nearly approaches such a straight line relationship that it is preferred herein to say that it is "able" to do so, by which expression is meant that the parts are so constructed that there is no mechanical interference preventing such a straight line relationship, the only factor preventing this being completely accomplished being the secondary spring 57.

The foregoing constitutes what may be aptly termed a "non-bottoming" connection between a wheel and an axle, this non-bottoming being effective for both an upward and a downward movement of the wheel relatively to its axle. This feature not only provides the vehicle with very remarkable riding qualities but also enables the tire 41 of the wheel to be kept in contact with the road. This, by actual test, has been found to add thirty-three percent to the mileage of a tire.

In Figs. 8 and 9 is shown a modification of the invention. In this case a saddle 261 is secured to the main spring 22 as before. Instead, however, of rigidly connecting the axle 271 to said saddle 261 and then journaling an eccentric head 28 upon said axle, the axle 271 itself is journaled directly in said saddle 261 and its outer form bent in the form of a crank so as to constitute an eccentric head having an eccentric axis upon which the hub 37 of the wheel 38 is directly journaled. Rotation of this axle 271 relatively to its saddles 261 is resiliently restrained as before by a secondary spring 57 which resiliently connects the frame 20 of the vehicle with the upper end of a torque arm 601 secured to said axle 271. For constructional and assembly purposes it is preferred that said axle 271 be constructed of two identically shaped sections rigidly joined together at their abutting ends by a clamp collar 63 and key 64. Such an arrangement prevents side sway (see my patent application, Serial No. 497,653) as well as providing the just described "non-bottoming" action.

In Fig. 10 is shown a still further modified form of the invention. In this case the main, leaf springs are dispensed with and the saddles 262 secured directly to the frame 20. The sections of the axle 272 are journaled in said saddles 262 as in the construction of Figs. 8 and 9. The fact, however, that no main leaf springs are provided augurs against a rigid connection between the axle sections, and hence in this construction the same are rotatably connected together by a split collar 632 which is keyed by a key 642 to the one axle section but is rotatably journaled on the other axle section, the latter being suitably turned down at 65 to receive an annular flange 66 formed in the bore of said split collar 632 and thereby preventing longitudinal displacement of the two axle sections relatively to each other and, at the same time, permitting rotary movement of the one axle section relatively to its companion axle section. It is obvious that with this construction of Fig. 10, each axle section requires a separate torque arm 602 and separate secondary spring 572.

It is obvious to those skilled in the art that the foregoing modifications of the invention do not constitute a descending series of desirability under like operating conditions, but, instead, constitute variations of the invention which are applicable to different types of vehicles which are subjected to different sorts of load and road conditions. The construction of Figs. 1–7 for instance, provides the minimum of unsprung weight and the maximum of easy riding on a drive axle where side sway is otherwise sufficiently taken care of. Figs. 8 and 9 illustrate a construction applicable to a non drive axle in which a spring suspension of considerable resiliency with side sway inherently taken care of. Fig. 10 illustrates a very inexpensive construction applicable to trailers and the like where each wheel of a non driving axle is provided with a degree of resilience equivalent to a "jumbo" pneumatic tire, but with a lesser degree of total axle resilience and with side sway sufficiently taken care of either by the other parts of the spring suspension (other axle) or by a suitable limitation in the softness of action of each axle section, this latter factor depending very considerably upon the kind of tire 412 which is to be employed.

I claim as my invention:

1. A resiliently mounted wheel associated with the main frame of a vehicle and comprising: a pair of main springs connected with said frame; a saddle connected to each main spring; a pair of eccentrics connected together and each rotatably connected with one of said saddles; a wheel journaled upon each eccentric; and means for resiliently restraining rotative movement of each of said eccentric heads relatively to its companion saddle.

2. A resiliently mounted wheel associated with the main frame of a vehicle and comprising: a pair of saddles; means connecting said saddles with said frame; a pair of eccentrics rotatably connected together and each rotatably connected with a companion saddle; a wheel journaled upon each eccentric head; and means for independently and resiliently restraining rotative movement of each of said eccentrics relatively to its companion saddle.

ALBERT F. HICKMAN.